United States Patent Office 3,709,700
Patented Jan. 9, 1973

3,709,700
SMOKE FLAVORING BARBECUE ADDITIVE
AND METHOD OF MAKING
Sheila W. Ross, 1211 S. Edris Drive,
Los Angeles, Calif. 90035
No Drawing. Filed Jan. 29, 1971, Ser. No. 110,663
Int. Cl. C101 5/00, 9/10
U.S. Cl. 44—6         12 Claims

ABSTRACT OF THE DISCLOSURE

A barbecue additive for smoke flavoring meat and other foodstuffs includes a combustible element having smoke producing flavor agents adhesively attached thereto which impart a desired flavor and aroma to the cooked foodstuff.

This invention relates to the art of barbecuing and more particularly relates to a smoke producing additive for flavoring barbecued meat and other foodstuffs.

The process of barbecuing meat and other foodstuffs generally involves igniting a bed of non-flamable, but combustible fuel, such as charcoal briquettes, allowing the bed of fuel to burn until it reaches a desired temperature, and then cooking the foodstuff over the hot bed. However, since the fuel is merely a source of heat for the cooking, certain additives generally in the form of wood chips are added to the bed during cooking to yield upon combustion a smoke and vapor containing substances which impart a flavor to the foodstuff.

The wood additive predominantly used for flavoring is hickory, although various other woods including redwood bark, fruit wood, and sassafras may be used to impart slightly different flavors and aromas. In any case however the types of flavors and aromas are relatively limited and amateur and professional chefs and cooks alike are constantly looking for other means to impart additional and substantially different flavors to the foodstuffs during barbecuing.

Therefore, it is a primary object of this invention to provide barbecue additives and method of making same which will impart numerous desired flavors to meat and other foodstuffs which are substantially different than the flavors imparted by the heretofore used additives.

Another object of this invention is to provide an additive which will impart at the same time several different flavors to a barbecued foodstuff.

A further object of this invention is to provide a barbecue additive using certain animal and vegetable food elements as the flavoring agents. In accordance with this object it is desirable to provide such an additive which can be stored for a substantial period prior to use without affecting the usable nature of the additive.

A still further object of this invention is to provide a barbecue additive which will uniformly impart certain desired flavors to meat and other foodstuffs while it is cooking.

Still another further object of this invention is to provide a foodstuff flavoring additive for use in barbecuing which is simple and inexpensive to produce and which can be used without deviating from the standard barbecue procedures.

Other and further objects and advantages of this invention will be made readily apparent from the following detailed description of the invention.

Certain elements and combinations of elements aside from wood, including mineral and vegetable food elements, are known to yield upon combustion a smoke and vapor containing substances which impart a delectable and very highly desired flavor to meat or other foodstuffs cooked in the presence of this smoke and vapor. These food elements or combinations of food elements which comprise the flavor agents of this invention include various spices, herbs, condiments, extracts, meat and dairy products, imitation flavorings and other food elements which form seasonings well known in the cooking art. Certain of the herbs, condiments and spices felt to be particularly desirable include onion, garlic, celery, bell pepper, tomato, anise, parsely, chives, dill, saffron, mint, mustard, pimento, arrowroot, chicory, cayenne, sesame, chili, clove, cinnamon, sage, marjoram, rosemary, nutmeg, ginger, oregano, thyme, cumin, curry, mace, coriander, hickory, paprika, savory, tumeric, chevil, taragon, cardamon, poppy seed, rosemary leaves, bay laurel leaves, olive, orange peel, lemon peel and various peppers and salts. These extracts felt desirable include almond puree, walnut, almon, vanilla and orange and those imitation flavorings considered most desirable include cherry, pineapple, strawberry, rum, brandy and maple. Bacon and cheese are also considered to be desirable and sugar, various wines and vinegar are felt to be useful in combination with the various other food elements. These seasonings are available in various forms, but the most common form is a liquid sauce or a dry particle mix. Therefore, these seasonings cannot be added to the fuel bed of the barbecue in the same manner as the wood chips, because most of the particles or most of the sauce will migrate between the briquettes and fall down below the fuel bed into the ashes without burning and producing the desired smoke and vapors.

In the present invention, the desired flavor agent is mixed with a suitable adhesive and applied to either the barbecue fuel briquettes or to wood chips. One type food element may be applied or several types of food elements forming a desired combination may be applied. Preferably, an adhesive is used which will not impart smoke and vapor of the type detrimental in the flavoring of the foodstuff. An adhesive found to be particularly desirable is comprised of corn dextrin, borax, water, sodium hydroxide and preservatives. It has been found that the adhesive not only secures the flavor agent to the combustible element, but also prevents deterioration of those flavor agents which include perishable food elements. Moreover, this particular adhesive is also desirable in that it retards the combustion of the flavor agent to produce better results. As stated before, the flavor agents may be attached to either wood chip additives or to the barbecue fuel briquettes, however, attaching the flavor agents to the wood chips is generally preferable. If the flavor agents are attached to the wood chips, the additives may be added to the bed at any time during the cooking of the foodstuff, additional flavoring is achieved, and the overall appearance of the product is generally more pleasing. It has been found that attaching the food particles to redwood bark chips produces a particularly unique and desirable overall appearance.

The method of producing the additives of this invention generally includes mixing an adhesive to either the flavor agent or to the combustible elements, that is, the fuel briquettes or wood chips, and then mixing the flavor agent with the combustible elements. The additive formed is then baked to dry the adhesive and the flavor agent if it is in the form of a liquid sauce and after the drying the combined product is ready for use. It should be noted again that the perishable animal or vegetable elements because of their combination with the adhesive are preserved to permit the product to be stored for relatively long periods before being used in a barbecue. Moreover, it should be noted that the flavor agent whether in particle or sauce form is distributed onto the surface of the combustible element in a generally uniform manner and thus causes the resulting flavor and aroma to be uniformly distributed to the barbecued foodstuff.

When barbecuing meats or foodstuffs, the barbecue fuel is ignited in the normal manner to properly prepare the fuel bed. The fuel briquettes or wood chips having the flavor agent attached thereto are then added at the desired time and the combustion of the flavor agent yields a smoke and vapor. The foodstuff being cooked is subjected to this smoke and vapor and the substances therein impart the desired flavor to the foodstuffs.

This invention provides a barbecue additive which will impart a variety of flavors to a barbecued foodstuff. Moreover, the smoke producing flavor agents will be properly burned by the barbecue fuel and the flavors and vapors yielded will be uniformly imparted to the barbecued foodstuff.

Having fully described my invention, it is to be understood that I do not wish to be limited to the details herein set forth, but my invention is of the full scope of the appended claims.

I claim:

1. A barbecue additive for smoke flavoring meat and other foodstuffs, comprising:
    a combustible element;
    an adhesive; and
    a flavor agent mixed with said adhesive and applied to the surface of said combustible element, said flavor agent being adapted to yield upon combustion a smoke and vapor containing substances which will impart a flavor to foodstuff exposed to the smoke and vapor during cooking.

2. The barbecue additive of claim 1, wherein said flavor agent includes a variety of food elements.

3. The barbecue additive of claim 1, wherein said adhesive includes a preservative and said flavor agent includes perishable food elements.

4. The barbecue additive of claim 1, wherein said adhesive is comprised of corn dextrin, borax, water and sodium hydroxide.

5. The barbecue additive of claim 1, wherein said flavor agent is a seasoning selected from a group consisting of herbs, condiments, spices, extracts and imitation flavorings.

6. The barbecue additive of claim 1, wherein said combustible element comprises a wood chip.

7. The barbecue additive of claim 6, wherein said wood chip is comprised of redwood bark.

8. A method of producing a barbecue additive for smoke flavoring meat and other foodstuffs, the steps consisting of:
    selecting a flavor agent adapted to yield upon combustion a smoke and vapor which will impart a flavor to a foodstuff;
    mixing an adhesive with said flavor agent;
    combining said flavor agent and said adhesive with a combustible element before said adhesive is dry to apply said flavor agent to the surface of said combustible element; and
    baking said combination to dry.

9. The method of claim 8, wherein a variety of different type flavor agents are selected and thereby affixed to said combustible element.

10. The method of claim 8, wherein said adhesive is provided with means to retard the combustion of said flavor agent.

11. A method of producing a barbecue additive for smoke flavoring meat and other foodstuffs, the steps comprising:
    selecting a flavor agent consisting of at least some particles which is adapted to yield upon combustion a smoke and vapor which will impart a flavor to a foodstuff;
    mixing an adhesive with said particles;
    combining said particles with a combustible element before said adhesive is dry to affix said particles in a substantially uniform manner to the surface of said combustible element; and
    baking said combination to dry said adhesive.

12. A method of producing a barbecue additive for smoke flavoring meat and other foodstuffs, the steps comprising:
    selecting a flavor agent including perishable food elements which is adapted to yield upon combustion a smoke and vapor which will impart a flavor to a foodstuff;
    selecting an adhesive which includes preservatives and which will not yield upon combustion a smoke and vapor which will impart a flavor to a foodstuff;
    mixing said adhesive with said flavor agent;
    combining said flavor agent and said adhesive with a combustible element before said adhesive is dry to apply said flavor agent to the surface of said combustible element; and
    baking said combination to dry.

References Cited
UNITED STATES PATENTS

| | | | |
|---|---|---|---|
| 3,454,377 | 7/1969 | Renwick | 99—229 X |
| 2,916,365 | 12/1959 | Smith | 44—41 |

MORRIS O. WOLK, Primary Examiner

S. MARANTZ, Assistant Examiner

U.S. Cl. X.R.

44—41; 99—140 R, 229